3,007,787
BUTYL XYLYL SULFONE
John Robert Campbell, St. Louis, and Roger E. Hatton, Kirkwood, Mo., assignors to Monsanto Chemical Company, St. Louis, Mo., a corporation of Delaware
No Drawing. Filed Mar. 16, 1960, Ser. No. 15,261
7 Claims. (Cl. 71—2.3)

This invention relates to butyl xylyl sulfone, and to herbicidal compositions thereof.

The preparation of butyl xylyl sulfone is illustrated in the following example. Parts are parts by weight.

EXAMPLE

To a suitable reaction vessel fitted with a reflux condenser and having means for the addition and removal of solids and liquids, means for measuring the temperature of the vessel contents and means for the addition and removal of heat, there is charged 8 parts of sodium hydroxide dissolved in 150 ml. of absolute ethanol. 27.6 parts of a commercially available thioxylenol (B.P. 210–220° C., sp. gr. 25°/4° C. 1.026 ref. index $n_D^{25}$ 1.5696) is then added rapidly while cooling the reaction mass so as to maintain its temperature at about 25° C. After completing the addition of the thioxylenol the reaction mixture is cooled to 10–15° C. and 27.4 parts of n-butylbromide is added. During the addition of butyl bromide the temperature of the reaction mass is maintained below 15° C. Thereafter the reaction mass is agitated for about 7 hours during which time the temperature of said mass is allowed to come to room temperature. The mixture is then heated for about 3 hours at a temperature sufficient to maintain reflux and the ethanol is then removed by distillation. The residue remaining after distillation is diluted with water and the organic material is extracted with ether and dried to yield 37.4 parts of butyl xylyl sulfide, a colorless liquid having a boiling range of 146–150° C. at 17 mm. of Hg and an index of refraction $n_D^{25°}$ of 1.5383.

Thereafter 36 parts of the butyl xylyl sulfide dissolved in 200 ml. of acetic acid (glacial) is charged to the reaction vessel and 109 ml. of 30% hydrogen peroxide is slowly added. The reaction mass is heated for 4 hours at temperatures of 65°–75° C. and then poured into cold water. The organic material is then removed from the water mixture by extraction with chloroform and the resulting chloroform solution is washed with dilute sodium hydroxide solution and then with water. Thereafter the solution is dried, the chloroform is removed by evaporation under vacuum and the residue distilled under vacuum to yield 40.5 parts of butyl xylyl sulfone, a yellow oil having a boiling range of 140°–143° C. at 0.8 mm. of Hg and an index of refraction $n_D^{25}$ of 1.5244.

Butyl xylyl sulfone is useful in effecting the destruction of plants and the selective control and inhibition of plant growth. More particularly butyl xylyl sulfone is useful as a herbicide in controlling the growth of grasses, especially in corn fields, since no noticeable adverse effect on corn has been observed by the use thereof.

For use as a herbicide butyl xylyl sulfone should be applied in an amount sufficient to exert the desired herbicidal action. However the amount of said sulfone present in compositions as actually applied for preventing the growth of weeds, i.e. undesired plants, will vary with the manner of application, the particular weeds for which the control is sought, etc. In general, herbicidal compositions containing as applied from about 0.5% to about 95% by weight of butyl xylyl sulfone are suitable for most applications.

Desirable herbicidal effects can be obtained by the application of small amounts, e.g. one-half pound, of butyl xylyl sulfone per acre, although it may be necessary or desirable to use applications as high as 50 pounds per acre. For general application as a pre-emergence herbicide amounts in the range of 1–25 pounds per acre can be used, greater selectivity being obtained at the lower concentrations.

The herbicidal compositions of this invention are prepared by admixing butyl xylyl sulfone in herbicidally effective amounts with an inert carrier to provide formulations adapted for ready and efficient application to soil, using conventional applicator equipment. Thus, the herbicidal compositions or formulations can be prepared in the form of solids or liquids. Solid compositions are preferably in the form of dusts and are compounded to give homogeneous, free-flowing dusts by admixing the compound with finely divided inert carriers such as talcs, clays, lime, bentonite, pumice, fuller's earth, pyrophyllite, diatomaceous earth, or flours such as walnut shell, wheat, redwood, soya bean, cottonseed flours and other inert solid materials of the kind conventionally employed in preparing herbicidal compositions in dusts or powdered form. On the other hand such inert carriers can be impregnated with butyl xylyl sulfone by means of a volatile solvent. These carriers or diluents can represent a substantial proportion, for example, 50 to 98 percent by weight of the entire formulation as applied.

Liquid compositions of the invention are prepared in the usual way by admixing butyl xylyl sulfone with a suitable liquid inert carrier or diluent. With certain solvents, such as alkylated naphthalene, methyl isobutyl ketone, methyl ethyl ketone, dimethyl formamide, hydrocarbons, e.g., kerosene, xylene, and cresol, high concentrations of the active ingredient can be obtained in solution. The proportions of such organic liquid additive depend upon the solubility of the active ingredient and may require as little as one percent or as much as 90 percent or more in order to provide a uniformly distributed formulation.

The herbicidal compositions of the invention, whether in the form of dusts or liquids, preferably include also an organic surfactant of the kind sometimes referred to in the art as a wetting, dispersing, or emulsifying agent. These surfactants have several functions, such as causing the compositions to be easily dispersed in water to give aqueous sprays which, for the most part, constitute desirable media for applications, or help in wetting the surfaces of the undesired plants to which a formulation is applied.

The organic surfactants employed can be of the anionic, cationic, or nonionic type. Generally, the surfactants will only be a minor portion of the formulation as used, for example, less than 15 percent and frequently as low as 0.05 percent by weight of the composition. Usually concentrations of from 0.5 to 5 percent are found to be optimum.

Anionic surfactants such as the sodium or potassium sulfonates and sulfates can be employed as the sole surfactant or can be used in combination with other surfactants. When such sulfonates are used it is preferred to use alkyl aryl sulfonates in which the alkyl chain is either straight or branched and contains from 8 to 22 carbon atoms, such as octyl, nonyl, decyl, undecyl, dodecyl, tetradecyl, pentadecyl, hexadecyl, octadecyl, and eicosyl. Examples of such sulfonates are sodium dodecyl, tridecyl benzene sulfonate and sodium or potassium lauryl benzene sulfonate. In the case of the sulfates those having an acyl radical of 8 to 22 carbon atoms are preferred. Examples of suitable sulfate surfactants are the sulfuric acid esters of polyhydric alcohols which are incompletely esterified with fatty acids, e.g. sodium coconut oil monoglyceride monosulfate, sodium tallow diglyceride monosulfate and the higher alkyl sulfates, e.g. sodium lauryl sulfate and sodium cetyl sulfate.

Additionally anionic surfactants such as the alkali metal sulfated or sulfonated alkyl acid amides and the alkali metal sulfated or sulfonated esters where in each case the alkyl group contains from about 12 to 18 carbon atoms, as sodium sulforicinoleate, can be used.

As mentioned above the compound of this invention also can be used with nonionic surfactants, such as the viscous liquid to wax-like water soluble substances containing a polyglycol ether group of the structure

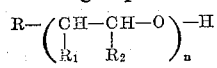

where R is the residue of a monomeric organic compound in which an active hydrogen has been replaced, examples of which compounds are alcohols, phenols, amides, primary and secondary amines, carboxylic acids, etc., $R_1$ and $R_2$ are hydrogen or short chain alkyl groups, e.g. ethyl, propyl iso-propyl, butyl, iso-butyl and tert-butyl and $n$ is an integer greater than 3. These nonionic surfactants are more fully described in United States Patents Nos. 1,970,578 and 2,213,477. Typical examples are the polyalkylene oxide derivatives (e.g. polyethylene oxide, polypropylene oxide and polybutylene oxide) of water-insoluble higher fatty acids, such as lauric, oleic, palmitic and stearic acid, including mixtures thereof such as can be obtained from tall oil, animal and vegetable fats and oils or by oxidation of petroleum fractions such as paraffin wax. Such surfactants are also exemplified by the polyalkylene oxide derivatives of water-insoluble organic hydroxy compounds such as the higher aliphatic alcohols, e.g. lauryl, oleyl, linoleyl, palmityl and stearyl alcohols, or mixtures thereof, and phenols, particularly alkyl phenols having at least 6 carbon atoms in the alkyl chain, e.g. dimethyl butyl, hexyl, octyl, iso-octyl, di-tert-butyl, decyl, isodecyl, and octadecyl. Also polyalkylene oxide derivatives of various amines, such as stearyl, lauryl, dicyclohexyl and dibutyl amine, can be used. It is usually preferable to use derivatives of polyethylene oxide because, for example, polypropenoxy groups of molecular weights higher than about 1200 act as hydrophobic radicals, of course unless water insolubility is desired.

In addition to the anionic and nonionic surfactants described above, cationic surfactants can also be used as the surfactant with which the compound of this invention is used. In many cases it may even be highly desirable to use cationic surfactants in order to take advantage of their known germicidal and fungicidal effects. Examples of cationic surfactants which can be used are the non-quaternary nitrogen bases such as the nitriles, e.g. the fatty nitriles such as stearonitrile, nitriles of substituted fatty acids, such as phenylstearic acid, and nitriles of rosin acids, especially those prepared from tall oil rosin; amines e.g. the materials produced by the addition of acetonitrile to diisobutylene or similar higher olefins in the presence of glacial acetic acid and concentrated sulfuric acid followed by hydrolysis of the acetyl derivative which is formed, and the N-polyethenoxy derivatives thereof, many of which are sold under the trade name Primine, fatty alkylamine substituted propylamines, such as the diamines marketed under the trade name Duomeen, as N-stearyl-1,3-propanediamine, alkyl polyamines, as for example the product obtained by reacting keryl chloride with triethylenetetramine; the imidazoline derivatives made by condensing a fatty acid with ethylenediamine; alkyltetrahydro-primidines; and the higher alkyl derivatives of guanidine, as lauroylcarbamyl guanidine. Further examples of cationic surfactants are the quarternary nitrogen bases of the general structure

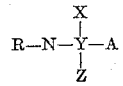

where R is a straight chain normal $C_{12}$ to $C_{18}$ radical, or the oleyl radical, or a long-chain carbonyl group, X, Y and Z are methyl, ethyl, benzyl, but not all of X, Y and Z are benzyl, thenyl, or aryloxyethyl, and A is chlorine, bromine, iodine, methosulfate or ethosulfate, examples of which are benzalkonium chloride and heptadecyldimethyl-benzylammonium sulfate.

The herbicidal effects which can be obtained by use of the compound of this invention are exemplified by utilization of the following test procedure.

*Pre-emergence test*

Seeds of fourteen different plants each representing a principal botanical type are planted in aluminum pans (9½" x 5¼" x 2¾"). A good grade of top soil which has been treated with 0.05% of a soil conditioner (Krilium) and screened through ½ inch wire mesh, is compacted to a depth of ⅜" from the top of the pan. The grass seeds are scattered randomly over one-half of the soil surface and the broadleaf seeds are scattered randomly over the remaining soil surface. The seeds are covered with ⅜" of the prepared soil mixture and the pan leveled.

The pan is next sprayed with 15 cc. of an organic solvent containing the unknown chemical to be tested. The initial test rate is an amount equivalent to 25 lbs. per acre. If results warrant, the compound is retested at lower rates per acre until the threshold toxicity level is determined.

An aqueous emulsion of the test compound can be prepared by first dissolving 0.5 gm. in 25 cc. of acetone or other suitable solvent. An aliquot of this stock solution (depending upon rate desired) is pipetted into an atomizer and 0.2 cc. of a 3:1 cyclohexanone-emulsifier mixture is added thereto. The resulting solution is then diluted to 15 cc. with water to form a useable emulsion.

After spraying, the pans are placed in ½" of water and allowed to absorb moisture through perforations in the bottom until the soil surface is about one-half moist. The pans are then transferred to wet sand bench in a greenhouse.

Fourteen days after application of the test chemical, the results are observed and recorded. The number of plants of each species which germinated and grew are counted and converted to a herbicidal rating by means of a fixed scale based on average percent germination. (Germination rates are established for all new seed lots and periodic checks run on old seen in current use.) The scale use is as follows:

*Herbicidal rating—conversion scale*

| Percent Germination—Control | 3 | 2 | 1 | 0 |
|---|---|---|---|---|
| 100 | 0-5 | 6-10 | 11-15 | 16-20 |
| 90 | 0-5 | 6-9 | 10-13 | 14-20 |
| 80 | 0-4 | 5-8 | 9-12 | 13-20 |
| 70 | 0-4 | 5-7 | 8-11 | 12-20 |
| 60 | 0-3 | 4-6 | 7-9 | 10-20 |
| 50 | 0-3 | 4-5 | 6-8 | 9-20 |
| 40 | 0-2 | 3-4 | 5-6 | 7-20 |
| Corn | 0-1 | 2 | 3 | 4-5 |

The relative value of each compound with respect to its herbicidal effect on each plant is indicated by a number as follows:

0—No phytotoxicity
1—Slight phytotoxicity
2—Moderate phytotoxicity
3—Severe phytotoxicity In the following table of herbicidal evaluation data the plants are represented by letters as follows:

| Code | Plant name | Plant Family | Genus | Species |
|---|---|---|---|---|
| A | Morning Glory | Convolvulaceae | Ipomoea | hederacea. |
| B | Wild Oat | Gramineae | Avena | fatua. |
| C | Brome | ----do---- | Bromus | tectorum. |
| D | Rye grass | ----do---- | Lolium | perenne. |
| E | Wild Buckwheat | Polygonaceae | Polygonum | convolvulus. |
| F | Radish | Cruciferae | Raphanas | sativus. |
| G | Sugar Beet | Chenopodiaceae | Beta | vulgaris. |
| H | Cotton | Malvaceae | Gossypium | herbaceum. |
| I | Corn | Gramineae | Zea | mays. |
| J | Foxtail | ----do---- | Setaria | faberii. |
| K | Barnyard | ----do---- | Echinochloa | crusgalli. |
| L | Crab Grass | ----do---- | Digitaria | sanguinalis. |
| M | Field Bindweed | Convolvulaceae | Convolvulus | arvensis. |
| N | Pigweed | Armaranthaceae | Amaranthus | retroflexus. |

Utilizing butyl xylyl sulfone in the above described test procedure, the following results were observed:

| Rate, lbs./acre | A | B | C | D | E | F | G | H | I | J | K | L | M | N |
|---|---|---|---|---|---|---|---|---|---|---|---|---|---|---|
| 25 | 0 | 3 | 3 | 3 | 3 | 3 | 3 | 0 | 0 | 3 | 3 | 3 | 0 | 3 |
| 5 | 0 | 0 | 0 | 1 | 0 | 0 | 1 | 0 | 0 | 2 | 3 | 3 | 0 | 3 |

As can be seen from the above the compound of this invention has fairly broad activity at the higher concentrations, is more selective at the lower concentrations and is not harmful to corn at any of the concentrations tested. Thus butyl xylyl sulfone can be used to control the growth of a wide variety of plants depending upon the concentration at which it is used.

A typical dust formulation, containing the compound of this invention, adapted for direct application is given below. The dust is prepared by blending or mixing the ingredients and grinding the mix to provide a composition having an average particle size less than about 50 microns.

| | Parts by weight |
|---|---|
| Butyl xylyl sulfone | 20 |
| Bentonite | 80 |
| | 100 |

Typical liquid compositions containing butyl xylyl sulfone and adapted to give aqueous dispersions for application as a spray is given below. Such compositions are prepared by thoroughly mixing or dispersing butyl xylyl sulfone and the various other ingredients in an organic liquid diluent.

| | Parts by weight |
|---|---|
| Butyl xylyl sulfone | 50 |
| Heavy aromatic naphtha | 45 |
| Long chain fatty alcohol sulfate | 2 |
| Goulac | 3 |
| | 100 |

| | Parts by weight |
|---|---|
| Butylyl xylyl sulfone | 30 |
| Alkylated aryl polyether alcohol | 3 |
| Methyl cellulose | 2 |
| Kerosene | 65 |
| | 100 |

Herbicidal compositions employing butyl xylyl sulfone can be applied to the soil by methods used in the art for pre-emergence control which include spraying a cultivated field, injecting a liquid formulation in a furrow by means of a suitable jet following a plow or harrowing device, dusting a field with a solid formulation before the field is plowed or any other suitable means whereby substantial uniform distribution of the herbicidal agent can be effected.

Both the solid and the liquid formulations described herein are useful in herbicidal applications of butyl xylyl sulfone because they facilitate the uniform distribution of said sulfone and aid in the control of undesirable plants by maintaining the active ingredients in a form which enables its prompt assimilation by the plant and the efficient utilization of its weed destroying properties. The described agents enable the proper use to achieve the desired herbicidal effect by an unskilled operator without elaborate equipment.

Fertilizer materials, other herbicidal and other pest control agents, such as fungicides and insecticides, can of course be included in the herbicidal compositions of the invention if desired.

Other modes of applying the principles of this invention will be apparent to those skilled in the art. Accordingly, while this invention has been described with reference to various specific examples and embodiments, it is understood that the invention is not limited to such samples and that it may be variously practiced within the scope of the following claims.

The embodiments of the invention in which an exclusive property or privilege is claimed are defined as follows:

1. A compound selected from the group consisting of butyl xylyl sulfide and butyl xylyl sulfone.
2. Butyl xylyl sulfone.
3. A herbicidal composition comprising an inert carrier and butyl xylyl sulfone.
4. A herbicidal composition comprising an organic surfactant and butyl xylyl sulfone.
5. A liquid herbicidal composition comprising a liquid inert carrier and butyl xylyl sulfone.
6. A composition of claim 5 where the liquid inert carrier is a hydrocarbon.
7. Butyl xylyl sulfide.

References Cited in the file of this patent

Shirari et al.: Bull. Nagoya City Univ. Phar. School, No. 2, 45–48 (1954). Cited in Chem. Abs., 50, 11337$^h$ (1956).